United States Patent
Brown et al.

(10) Patent No.: US 12,246,532 B2
(45) Date of Patent: Mar. 11, 2025

(54) VACUUM APERTURE VALVE ARRAY

(71) Applicant: AGFA NV, Mortsel (BE)

(72) Inventors: Andrew James Brown, Cambridge (GB); Anderson McKeague, Cambridge (GB)

(73) Assignee: AGFA NV, Mortsel (BE)

( * ) Notice: Subject to any disclaimer, the term of this patent is extended or adjusted under 35 U.S.C. 154(b) by 294 days.

(21) Appl. No.: 17/720,578

(22) Filed: Apr. 14, 2022

(65) Prior Publication Data
US 2022/0332130 A1    Oct. 20, 2022

(30) Foreign Application Priority Data
Apr. 14, 2021 (GB) .................................. 2105315

(51) Int. Cl.
| | | |
|---|---|---|
| *B65H 5/22* | (2006.01) | |
| *B41J 11/00* | (2006.01) | |
| *F16K 15/14* | (2006.01) | |
| *F16K 15/16* | (2006.01) | |
| *F16K 51/02* | (2006.01) | |

(52) U.S. Cl.
CPC ....... *B41J 11/0085* (2013.01); *F16K 15/1401* (2021.08); *F16K 15/16* (2013.01); *F16K 51/02* (2013.01)

(58) Field of Classification Search
CPC .......... B65H 2406/41; B65H 2406/413; B65H 2406/418; B65H 2406/3632; B65H 2406/362; B65H 5/22; B65H 5/224; B65H 5/226; B41J 11/0085; B41J 11/06
See application file for complete search history.

(56) References Cited

U.S. PATENT DOCUMENTS

| | | | | |
|---|---|---|---|---|
| 5,374,021 A | * | 12/1994 | Kleinman | B25B 11/005 248/362 |
| 6,270,074 B1 | | 8/2001 | Rasmussen et al. | |
| 6,571,702 B2 | * | 6/2003 | Wotton | B41J 11/0022 101/232 |

FOREIGN PATENT DOCUMENTS

| | | | |
|---|---|---|---|
| EP | 2022740 A2 | 2/2009 | |
| EP | 2949911 | 12/2015 | |
| GB | 2111647 A | * 7/1983 | ......... B65G 21/2036 |
| GB | 2370813 A | 10/2002 | |
| JP | 2018058254 A | 4/2018 | |
| WO | 2017154881 A1 | 9/2017 | |

OTHER PUBLICATIONS

Great Britain Combined Search and Examination Report under Sections 17 and 18(3), Application No. GB2105315.2, dated Sep. 30, 2021.

(Continued)

*Primary Examiner* — Luis A Gonzalez
(74) *Attorney, Agent, or Firm* — MacMillan, Sobanski & Todd, LLC (57) ABSTRACT

A sheet 200 for an array of vacuum apertures 152 in a substrate support unit 150 of a printer is provided. The sheet 200 comprises a plurality of valves 202 formed into the sheet 200. The sheet 200 is made from a resilient material. Each valve 202 comprises a valve head 204 for sealing a vacuum aperture 152 in the substrate support unit 150, and a valve lever arm 206 for permitting movement of the valve head 204 towards and away from the vacuum aperture 152 in order to open and close the valve 202.

14 Claims, 6 Drawing Sheets

(56) References Cited

OTHER PUBLICATIONS

The extended European search report, Application No. 22168536.5, dated Sep. 12, 2022.
European Communication pursuant to Article 94(3) EPC, Application No. 22168536.5, dated Jun. 14, 2024.

\* cited by examiner

VACUUM APERTURE VALVE ARRAY

The present disclosure relates to a sheet for an array of vacuum apertures in a substrate support unit of a printer table.

Printers can provide a printer table on which a substrate is to be printed. Printer tables have a substrate support unit which has a support surface for supporting a substrate to be printed. Printer tables can be used for flat-bed printers, where a substrate is printed on the table, for example by passing an array of printheads over the substrate. Other printer tables can be used for conveyor printers, where a substrate is moved along a conveyor belt arranged on the support surface to pass under an array of printheads.

To hold the substrate in place, the substrate support surface can have an array of apertures connected to a source of negative air pressure. It is desirable for printer systems to be able to print a wide range of substrate shapes and sizes. To hold down a wide range of substrate types of different thicknesses and porosities, a dense array of small vacuum apertures can be used. The substrate is placed onto the table for printing, with the substrate covering at least some of the apertures on the surface. When the negative pressure is applied, air is drawn through the apertures in the printer table, and the negative pressure acts to hold the substrate to the surface.

Due to the small cross-sectional area of the vacuum apertures, it is necessary to develop a relatively strong negative pressure at the aperture in order to achieve good vacuum force local to the aperture. It is difficult and energy inefficient to try and maintain relatively strong vacuum if there are many leaks in the vacuum system.

Problems can arise where the size of the substrate is less than the area of the surface covered with apertures. In this case, when the substrate is placed on the surface, some apertures remain uncovered by the substrate. These uncovered apertures effectively cause a leak and lead to a loss of vacuum pressure across the surface as a whole, reducing the force holding the substrate against the surface. In other words, the effectiveness of the pressure securing the substrate on the surface is reduced as some apertures remain uncovered. This means the substrate may not lie completely flat and uniformly on the surface, which can cause printing errors such as a reduction in print quality or another malfunction. Open apertures can also lead to high airflow near printhead nozzles, which can disrupt printing and lead to a reduction in print quality.

In attempt to improve this, conventional systems can apply a mask to the surface to cover apertures not covered by the substrate. Such masks, for example, may include paper, card, or a plastic sheet material cut to the appropriate shape. Several mask elements may be used, especially where the substrate is of an irregular shape. The negative pressure can hold the mask to the table, covering the otherwise uncovered apertures. Such masks often require fixing to the surface to securely hold down the mask, especially where a similar layout of substrates is to be used for several consecutive printing operations. Additionally, an application of positive pressure is often used to assist in removal of a substrate after printing, but this can also dislodge the mask which is disadvantageous. Applying a mask using a tacky or adhesive backing to hold the mask to the surface can leave an adhesive residue on the surface and is not suitable for repeated application, having a limited service life. Applying a mask using adhesive tape is labour intensive and adds significant time to the print cycle. The tape and adhesive is also often not resistant to the effects of UV radiation or heat, which it can be exposed to during the printing cycle. Exposure over several cycles can lead to a loss of adhesion, causing a loss in print quality and increase in time spent reattaching the tape or mask.

Retaining the mask for printing several substrates leads to a greater risk of the tape becoming dislodged. Also, the positive pressure for removing the substrate can damage the mask or lead to partial lifting from the table.

In cases where the printer system is a vacuum conveyor, it is not possible to use conventional masking techniques because the substrate moves with the conveyor belt over the vacuum apertures in the table, and therefore the position changes and different apertures will be covered by the substrate over time, meaning that masking is not possible while the conveyor is running. In a vacuum conveyor, different size substrates and variable gaps between the substrates results in continual leakage which must be controlled in order to maintain the vacuum hold-down force. Leaking holes immediately adjacent to the substrate edges will also interfere with inkjet drop placement accuracy near to the substrate edge.

Alternatively, conventional systems can include ball valves in the apertures which use springs to allow a ball bearing to move to open and close the apertures to self-seal the uncovered apertures. However, such arrangements are costly and complex, requiring many small springs to be fitted into the apertures. For example, typical printer tables contain over 2000 vacuum apertures per $m^2$, requiring many springs and ball bearings which must be provided in a small form factor which is costly and difficult to implement and also limits the density of apertures.

This results in a complex, fiddly, and time-consuming setup. Maintenance of replacing these ball valves is also complex and time-consuming.

The present disclosure attempts to address one or more of the above mentioned problems.

According to a first aspect of the present disclosure, there is provided a sheet for an array of vacuum apertures in a substrate support unit of a printer, comprising: a plurality of valves formed into the sheet; wherein the sheet is made from a resilient material; and wherein each valve comprises a valve head for sealing a vacuum aperture in the substrate support unit, and a valve lever arm for permitting movement of the valve head towards and away from the vacuum aperture in order to open and close the valve.

In this way, the valves can be operated to move to close the vacuum apertures. This can be effected automatically when a substrate covers the vacuum aperture by causing a pressure differential and the air drag force pulls the valve head down towards the vacuum aperture. The valve lever arm permits the movement of the valve head by bending due to the resilience of the sheet.

This allows a plurality of valves to be used for opening and closing an array of vacuum apertures in a substrate support unit of a printer. For example, the printer may be an ink-jet printer. The printer may be a flat-bed printer. In other examples, the printer may be a conveyor printer which uses a conveyor belt to move a substrate past a printhead in a printing motion. For example, the substrate may comprise paper or cardboard. The sheet provides a simple and cheap solution which avoids the need for ineffective masking. For conveyor printers, masking is not possible, so this avoids the need for complex ball valves. The sheet can be rapidly produced simply by forming the valves from the sheet, such as by cutting. This allows for rapid production and prototyping, and permits easy and fast replacement, limiting downtime of the printer.

Preferably, the resilient material comprises a plastic.

Preferably, the plastic comprises BoPET. In other examples, the resilient material comprises polyimide e.g. Kapton®, styrene, polyvinyl chloride (PVC), or polycarbonate.

Preferably, the sheet has a thickness of between 0.1 mm and 0.5 mm. More preferably, the sheet has a thickness of between 0.2 mm and 0.4 mm. In one example, the sheet has a thickness of 0.225 mm. In a most preferred example, the sheet has a thickness of 0.35 mm. By providing a thickness of less than around 0.5 mm, preferably around 0.35 mm, the valve head is light enough that the time to open the valve is short, improving the efficiency.

Preferably, the valve lever arm has the same thickness as the remainder of the sheet. In other words, the thickness of the sheet is uniform. The valve head and the valve lever arm can have the same thickness. This makes it easier to manufacture because it is not necessary to reduce the thickness of the sheet in any region.

Preferably, the plurality of valves are defined by a plurality of cut-outs in the sheet. The cut-out sections leave material which form the valve lever arm and the valve head. The cut-outs forms gaps in the sheet, which also permit airflow through the valve.

Preferably, the valve head is connected to the sheet by the valve lever arm. For example, the valve head may be connected to the sheet only by the valve lever arm. Otherwise, the valve head is free from the sheet. This allows the valve head to move to and from the vacuum aperture.

In some examples, when the valve is open, the valve head is arranged in the plane of the sheet, for example being in line with the rest of the sheet. In other words, the valve head is preferably not pre-bent into a different plane in the open configuration. This improves ease of manufacture because the valve head does not require pre-bending into another position. Instead, the flat sheet can simply be provided, and the valve head can simply be provided by cutting out a section of the sheet, for example.

Preferably, the valve lever arm is configured to permit the valve head to move out of the plane of the sheet. This allows the valve head to move towards the vacuum aperture to close the valve. To achieve this, the valve lever arm is bendable so that the valve lever arm can bend as the valve head is pulled down towards the vacuum aperture. As the sheet is resilient, the valve lever arm can be configured to return the valve head to the plane of the sheet when the force closing the valve is removed. In other words, tension due to the bending of the valve lever arm pulls the valve head and returns it to the equilibrium position in the plane of the sheet, thus opening the valve. Thus, the valve may be auto-resetting. This is particularly preferable for conveyor printers, where it is not convenient to require a separate opening mechanism, and this does not require shutting off the vacuum.

Preferably, the valve lever arm is configured to cause the valve head to remain parallel to the plane of the sheet when the valve head is arranged out of the plane of the sheet. This is achieved by the particular shape of the valve lever arm. For example, this can be provided by using a valve lever arm which is curved around the side of the valve head. In other examples, this can be provided by a valve lever arm which is straight and has a length greater than the width of the valve head.

In some examples, the valve head may be arranged parallel to the plane of the sheet when the valve is closed. In other words, when the valve head covers the vacuum aperture to close the valve, the valve head may be arranged parallel to the plane of the sheet. In some examples, the valve head may be arranged parallel to a plane defined by an upper surface of the substrate support unit when the valve is closed. The plane of the sheet may be parallel to the plane defined by the upper surface of the substrate support unit. Thus, the valve head may be arranged parallel to the plane of the sheet and parallel to the upper surface of the substrate support unit. This allows the valve head to lie flat against the vacuum aperture to provide an improved seal. The valve head may be arranged parallel to a plane of the vacuum aperture, for example when the valve head closes the valve. In other words, the valve head may lie flat (e.g. horizontal) on the substrate support unit to close the valve. This is in contrast to the valve head lying at an angle, where the substrate support unit is also at an angle. For instance, the substrate support unit may comprise a recess (e.g. cut into the substrate support unit) in which the vacuum aperture is arranged, and the valve head may be arranged to contact a base of the recess to seal the vacuum aperture to close the valve. In some cases, the base of the recess may be parallel to an upper surface of the substrate support unit (e.g. horizontal).

Preferably, the valve lever arm has a length equal to or greater than a width of the valve head. This enables the valve head to move generally parallel to the plane of the sheet so that the valve head can lie flat against the vacuum aperture. The valve lever arm may have a length which is longer than the width of the valve head, preferably at least twice as long, more preferably at least three times as long, even more preferably at least four times as long. Most preferably, the valve lever arm has a length between two and five times the width of the valve head, to provide desired flexibility for ensuring the valve head can lie flat against the vacuum aperture, whilst improving compactness and density of valves.

Preferably, the valve lever arm is configured to permit the valve head to lie flat against the vacuum aperture to seal the vacuum aperture. This allows for a more effective seal. For example, the valve lever arm may permit the valve head to close the vacuum aperture by arranging the valve head parallel to a plane of the vacuum aperture and in contact with the vacuum aperture.

Preferably, the valve lever arm extends from the sheet at a first side of the valve head around the side of the valve head and is connected to the valve head at a second side opposite the first side. This shape permits the valve head to lie flat against the vacuum aperture by being arranged in a plane parallel to the sheet, while also providing a compact arrangement because the valve lever arm is arranged in a small space surrounding the valve head. This allows the packing density to be increased relative to straight valve lever arms.

Preferably, the valve lever arm is curved around the side of the valve head between the first side and the second side. For example, the valve head may be circular. This further improves the compactness by following the curve of the circular valve head. In other examples, the valve lever arm may extend around the valve head in a U-shape.

Preferably, the plurality of valves comprises between 2000 and 3000 valves per $m^2$ of the sheet. This enables a large density of vacuum apertures to be controlled. Clearly, providing this density of ball valves would be complex and expensive, so using a simple sheet provides a much more useful solution.

Preferably, each valve comprises a bypass for equalising pressure. This aids the opening of the valve when the substrate no longer covers the opening. This allows the valve to be auto-resetting. This means that a separate mechanism is not required to open the valve. Instead, the valve automatically opens in response to the substrate no longer covering the opening. This simplifies construction and operation.

Disclosed herein is a kit of parts, comprising: a first sheet according to the first aspect; and a second sheet comprising a plurality of recesses formed into the second sheet, wherein each recess is configured to align with a vacuum aperture when arranged over the substrate support unit, and wherein each recess is configured to receive a valve of the first sheet when the first sheet is arranged over the second sheet.

According to a second aspect of the present disclosure, there is provided a kit of parts, comprising: a first sheet for an array of vacuum apertures in a substrate support unit of a printer, comprising: a plurality of valves formed into the first sheet; wherein the first sheet is made from a resilient material; and wherein each valve comprises a valve head for sealing a vacuum aperture in the substrate support unit, and a valve lever arm for permitting movement of the valve head towards and away from the vacuum aperture in order to open and close the valve; and a second sheet comprising a plurality of recesses formed into the second sheet, wherein each recess is configured to align with a vacuum aperture when arranged over the substrate support unit, and wherein each recess is configured to receive a valve of the first sheet when the first sheet is arranged over the second sheet.

Thus, the first sheet of the second aspect may include any features described in relation to the sheet of the first aspect.

Preferably, the recesses of the second sheet provide a space to permit movement of the valve head towards the vacuum aperture for closing the valve.

Disclosed herein is a substrate support system for a printer, comprising: a support unit having an upper surface comprising: a plurality of vacuum apertures arranged in fluidic communication with a source of negative pressure; and a plurality of recesses aligned with the plurality of vacuum apertures, wherein each recess is configured to receive a valve of the sheet as disclosed herein.

According to a third aspect of the present disclosure, there is provided a substrate support system for a printer, comprising: a support unit having an upper surface comprising: a plurality of vacuum apertures arranged in fluidic communication with a source of negative pressure; and a plurality of recesses aligned with the plurality of vacuum apertures, wherein each recess is configured to receive a valve of a sheet of valves.

The substrate support system is for supporting a substrate to be printed by the printer. For example, the printer may be an ink-jet printer. For example, the printer may be a conveyor printer which uses a conveyor belt to move a substrate through the printer for printing. In other examples, the printer may be a flat-bed printer.

The vacuum apertures and the recesses are therefore formed in the upper surface of the support unit. The recesses can be shaped to receive valves of the sheet, and the vacuum apertures can be arranged at the base of the recesses. The recesses may have a base surface which is parallel to the upper surface of the support unit. The base surface may be flat (e.g. horizontal). The base surface may be parallel to a plane in which the valve head of the sheet is arranged to close the valve. In this way, the valve head can lie flat against the base surface.

Preferably, the substrate support system further comprises the sheet of valves, wherein the sheet comprises: a plurality of valves formed into the sheet; wherein the sheet is made from a resilient material; and wherein each valve comprises a valve head for sealing a vacuum aperture in the support unit, and a valve lever arm for permitting movement of the valve head towards and away from the vacuum aperture in order to open and close the valve, wherein the sheet is arranged on the upper surface, and wherein the valves are arranged in the respective recesses.

Preferably, the substrate support system further comprises the sheet as disclosed herein (such as the sheet of the first aspect of the present disclosure), wherein the sheet is arranged on the upper surface, and wherein the valves are arranged in the respective recesses. The recesses therefore form spaces for receiving the valves. In particular, the recesses allow the valve head to move out of the plane of the sheet to close the valve by sealing against the vacuum aperture. The recess is configured to permit movement of the valve so that the valve head can engage the vacuum aperture to close the valve. The recess may have a complementary shape to the shape of the valves. The recess may permit movement of the valve head into the recess to permit the valve head to lie against the base of the recess (e.g. parallel) to close the vacuum aperture (e.g. the valve head may lie flat against the base). For example, the recesses may be in the form of pockets which are machined into the upper surface of the support unit, such as by milling.

Preferably, the plurality of recesses each comprise a base surface in which the vacuum aperture is arranged, wherein the base surface is parallel to the upper surface of the support unit, and wherein each valve head of the sheet is configured to be arranged along the base surface of the respective recess to seal the vacuum aperture when the valve is closed. This allows the valve head to lie flat against the base surface to ensure an even seal against the vacuum aperture. The plane of the base surface may be parallel to the plane in which the valve head is arranged when the valve is closed. The plane of the base surface may be parallel to the plane of the sheet (e.g. when the valve is open). In other words, the base surface is preferably not angled or inclined relative to the upper surface. This improves ease of manufacture while ensuring a good seal by allowing the valve to lie flat.

Preferably, the substrate support system further comprises a conveyor belt arranged over the upper surface for supporting a substrate to be printed on, the conveyor belt comprising a plurality of belt apertures, and wherein the vacuum apertures are configured to convey a negative pressure through the belt apertures for retaining the substrate on the conveyor belt. In this example, the printer can be a conveyor printer. The sheet can then be used for operating valves for the vacuum apertures used for holding down a substrate on the conveyor belt. This system may or may not comprise air bearings as disclosed herein. In some examples, the substrate support system may comprise a plurality of air bearings as disclosed herein, such as porous air bearings. The air bearings may be connected to a source of positive pressure for supporting the conveyor.

Preferably, each valve is configured to automatically close when a substrate does not cover the respective vacuum aperture and is configured to open when a substrate covers the respective vacuum aperture. This can be provided by the stiffness of the valve lever arm being sufficiently low so that the air drag force pulls the valve head.

The source of negative pressure may be arranged to supply a pressure of between −100 mbarg to −200 mbarg which is sufficient to open and close the valves, and to hold down the substrate. The term "mbarg" refers to units of pressure in mbar relative to atmospheric pressure (approximately 101 kPa).

In some examples, the kit of parts as disclosed herein may be used with a substrate support system comprising a support unit having a plurality of vacuum apertures in an upper surface arranged in fluidic communication with a source of negative pressure. In this case, the second sheet provides the recesses, which may have a similar function to the recesses in the substrate support system of the third aspect, and features may be applied herein.

Disclosed herein is a method of manufacturing the sheet as disclosed herein, the method comprising: providing a sheet made from a resilient material; and forming a plurality of valves into the sheet, wherein each valve comprises a valve head for sealing a vacuum aperture in the substrate support unit, and a valve lever arm for permitting movement of the valve head towards and away from the vacuum aperture in order to open and close the valve.

Disclosed herein is a method of manufacturing a sheet for an array of vacuum apertures in a substrate support unit of a printer, the method comprising: providing a sheet made from a resilient material; and forming a plurality of valves into the sheet, wherein each valve comprises a valve head for sealing a vacuum aperture in the substrate support unit, and a valve lever arm for permitting movement of the valve head towards and away from the vacuum aperture in order to open and close the valve.

For example, the sheet may be the sheet disclosed herein, such as the sheet of the first aspect.

Preferably, the forming the plurality of valves comprises cutting the sheet to form a plurality of cut-outs, wherein the plurality of cut-outs define the plurality of valves.

Preferably, the cutting comprises laser cutting.

Disclosed herein is a sheet for an array of vacuum apertures, comprising: a plurality of valves formed into the sheet; wherein the sheet is made from a resilient material; and wherein each valve comprises a valve head for sealing a vacuum aperture in the substrate support unit, and a valve lever arm for permitting movement of the valve head towards and away from the vacuum aperture in order to open and close the valve. In this way, the sheet may be used for other vacuum apertures other than in printer systems. Features of other aspects may be readily applied.

Features of one aspect can be readily applied to the other aspect and vice versa. In particular, it will be appreciated that features of the sheet of the first aspect may be applied to the kit of parts of the third aspect and the substrate support system of the third aspect. Apparatus features can readily be applied to the method and vice versa.

Embodiments of the disclosure are described below, by way of example only, with reference to the accompanying Figures.

Figure 1:
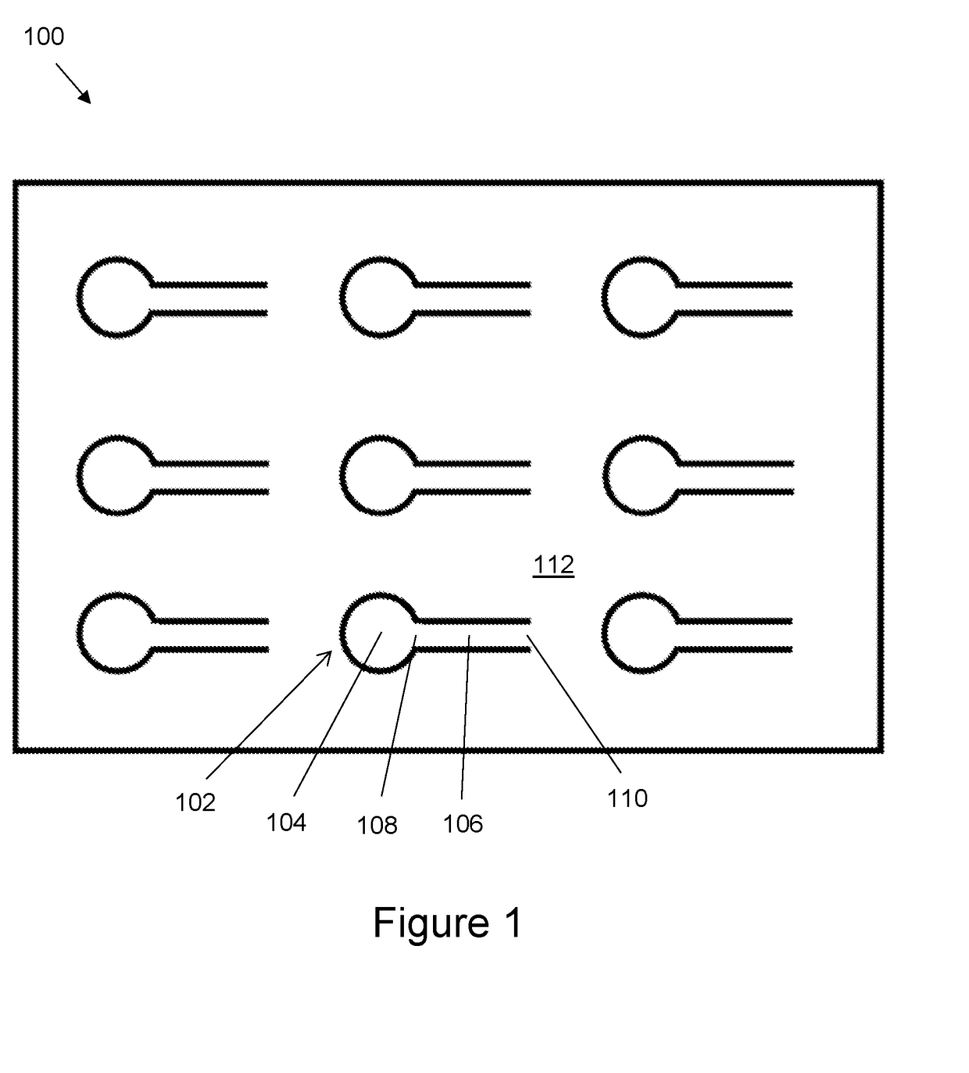
FIG. 1 shows a plan view from above of a sheet according to a first embodiment of the present disclosure.

Referring to FIG. 1, a sheet 100 according to a first embodiment is provided. The sheet 100 is substantially planar having a thickness which is much less than its width and length. Because the sheet 100 is planar, this means it can be placed over a surface. The sheet 100 is provided for use with a substrate support unit of a printer table. The substrate support unit comprises an array of vacuum apertures in a support surface which are used for holding down a substrate placed on the support surface. The sheet 100 is configured to be placed over the support surface and can be used for opening and closing the vacuum apertures.

The sheet 100 comprises a plurality of valves 102. The valves 102 are formed in the sheet 100. In particular, the valves 102 are cut into the sheet 100. A cutting operation on the sheet 100 results in a plurality of cut-outs from the sheet 100 which are sections removed from the sheet 100 by the cutting. The valves 102 are defined by the cut-outs in the sheet 100. The cut-outs leave remaining portions in the sheet 100 which form the valves 102. In this way, the valves 102 are integral with the sheet 100. The valves 102 are part of the sheet 100 and are made from the same material as the sheet 100. In other words, the valves 102 are monolithic with the sheet 100. This means the valves 102 are not separate, and instead are integral and made of the same material as the sheet 100.

The sheet 100 is made from a resilient material. In the first embodiment, the sheet 100 is made from biaxially-oriented polyethylene teraphthalate (BoPET), sometimes referred to by the trade name Mylar®. In other examples, other resilient materials may be used, such as polyimide e.g. Kapton®, styrene, polyvinyl chloride (PVC), or polycarbonate. The sheet 100 is non-porous, in particular the sheet 100 is not porous to air. This means that air cannot pass through the material of the sheet 100. This allows airflow to be prevented when the valves 102 are closed.

Each valve 102 comprises a valve head 104. The valve head 104 is provided for sealing a vacuum aperture of a substrate support unit of a printer table. As will be described in more detail below, when the valve head 104 is placed against the vacuum aperture, the aperture is sealed and thus the valve 102 is closed. When the valve head 104 is positioned away from the vacuum aperture, the aperture is not sealed and thus the valve 102 is open.

The valve head 104 is integral with the sheet 100. The valve head 104 is made from the same material as the sheet 100.

The valve head 104 has a shape generally corresponding to the shape of the vacuum aperture. In the first embodiment, the valve head 104 is generally circular. In other embodiments, the valve head 104 may have a different shape, for example to fit different shapes of vacuum aperture.

Each valve 102 also comprises a valve lever arm 106. The valve lever arm 106 is provided for permitting the valve head 104 to move to open and close the vacuum aperture. In other words, the valve lever arm 106 permits movement of the valve head 104 relative to the remainder of the sheet 100. To permit this movement, the valve lever arm 106 is connected to the valve head 104. In particular, the valve lever arm 106 is connected to the valve head 104 at a portion of the perimeter of the valve head 104. In the first embodiment, as the valve head 104 is generally circular, the valve lever arm 106 is connected to the valve head 104 at a portion of the circumference of the valve head 104. The valve head 104 therefore forms an incomplete circle, with the valve lever arm 106 interrupting the circumference. At this location, the valve lever arm 106 is connected to the valve head 104. In this manner, the valve head 104 is contiguous with the valve lever arm 106. In other words, the valve lever arm 106 attaches the valve head 104 to the rest of the sheet 100.

The valve lever arm 106 is integral with the sheet 100. The valve lever arm 106 is made from the same material as the sheet 100. The valve lever arm 106 is integral with the valve head 104. The valve lever arm 106 is made from the same material as the valve head 104. In the first embodiment, the entire sheet 100 is made from the same material.

The valve lever arm 106 is connected to the valve head 104 via a valve head connection 108. The valve head connection 108 is integral and formed from the sheet 100. The valve head connection 108 is a portion of the sheet 100 which connects the valve lever arm 106 to the valve head 104. The valve lever arm 106 is also connected, at its opposite end, via a sheet body connection 110 to a sheet body 112 of the sheet 100. The sheet body 112 is the remaining portion of the sheet 100 between the plurality of valves 102. The sheet body 112 is integral with the sheet 100 and is made from the same material. The sheet body connection 110 is integral and formed from the sheet 100. The sheet body connection 110 is a portion of the sheet 100 which connects the valve lever arm 106 to the sheet body 112. In this manner, the valve lever arm 106 extends between the sheet body connection 110 and the valve head connection 108. Hence, the valve lever arm 106 provides a connection between the valve head 104 and the sheet body 112.

In the first embodiment, the valve lever arm 106 is straight. The valve lever arm 106 is defined by cut-outs in the form of two opposing straight and parallel lines. This forms a generally rectangular shape. The valve lever arm 106 extends in a length along the parallel lines from the sheet body connection 110 to the valve head connection 108, and has a width from one parallel line to the opposite parallel line perpendicular to the length. The width of the valve lever arm 106 is less than the width of the valve head 104 (i.e. less than the diameter of the circular valve head 104 in the first embodiment).

The valve head 104 is also defined by a cut-out in the form of a perimeter of the valve head 104. In the first embodiment, as the valve head 104 is circular, the cut-out is in the form of a partial circumference of a circle. The cut-outs of the valve lever arm 106 are connected to the cut-out of the valve head 104. In particular, the cut-outs of the valve lever arm 106 and the valve head 104 are continuous, so that the valve 102 comprises a single continuous cut-out. As such, the valve 102 can be defined by a single cut-out which includes one parallel line defining an edge of the valve lever arm 106, which is connected to a partial circumference of a circle defining the valve head 104, which in turn is connected to the second parallel line defining the opposite edge of the valve lever arm 106. This means that only one cut needs to be made into the sheet 100 to provide each valve 102, making manufacturing cheap and simple.

The valves 102 are formed by cutting the sheet 100 through the thickness of the sheet 100. The forming of the valves 102 does not comprise cutting or otherwise machining the sheet 100 to change the thickness of the sheet 100. This means that the thickness of the sheet 100 is constant. As such, the thickness of the valve lever arm 106 is the same as the rest of the sheet 100, including the valve head 104 and the sheet body 112. This is advantageous because the manufacturing process can be significantly simplified compared to one which requires the thickness of the sheet 100 to be reduced. Because the sheet 100 is made from a resilient material, the valve lever arms 106 are resilient without the need for reducing the thickness of the sheet 100 in the regions of the valve lever arms 106. This provides the necessary resilience, while simplifying the manufacturing process. In the first embodiment, the cutting process can be performed by laser cutting. In other embodiments, other techniques can be used.

The rectangular valve lever arm 106 is connected to one side of the circular valve head 104 so that together the valve 102 has a generally lollipop shape. The valve 102 is connected to the sheet body 112 at the end of the valve lever arm 106 opposite to the valve head 104. In other words, the valve 102 is connected to the sheet body 112 at the sheet body connection 110. The valve 102 is not connected to the sheet body 112 at any other location. This means the valve 102 is freely moveable relative to the sheet body 112, and is only attached by the sheet body connection 110. Thus, the valve lever arm 106 provides the only point of connection between the valve head 104 and the sheet body 112. This means that, other than the valve lever arm 106, the valve head 104 is free and can move freely relative to the sheet body 112. In particular, the cut-out section around the valve head 104 means that the valve head 104 can freely move relative to the sheet body 112 which surrounds the perimeter of the valve head 104 other than where the valve head 104 is connected to the valve lever arm 106. This allows the valve lever arm 106 to control movement of the valve head 104 relative to the sheet body 112.

The purpose of the valve lever arm 106 is to permit movement of the valve head 104 towards and away from the vacuum aperture in order to open and close the valve. To achieve this, the valve head 104 is able to move out of the plane of the sheet 100 in order to move towards the vacuum aperture. The plane of the sheet 100 is defined as the plane in which the surface of sheet 100 is arranged. In other words, the width and the length of the sheet 100 are arranged in the plane of the sheet 100. The thickness of the sheet 100 is perpendicular to the plane of the sheet 100.

Because the sheet 100 is resilient, and the valve lever arm 106 is formed from the sheet 100, the valve lever arm 106 itself is resilient. The valve lever arm 106 is flexible. This allows the valve lever arm 106 to deflect and deform to permit the movement of the valve head 104 out of the plane of the sheet 100. When the valve head 104 is pulled away from the plane of the sheet 100, the valve lever arm 106 bends to permit the movement. The valve lever arm 106 forms a hinge at the sheet body connection 110 between the valve lever arm 106 and the sheet body 112. The valve lever arm 106 thus lies at an angle relative to the sheet body 112 when the valve head 104 is moved out of the plane of the sheet 100.

In the first embodiment, the valve lever arm 106 has a length equal to or greater than the width of the valve head 104. In the first embodiment, the valve head 104 is circular so the width of the valve head 104 is the diameter. In the first embodiment, the length of the valve lever arm 106 is equal to twice the diameter of the valve head 104. In other examples, the length may be different, and in one example may be between two and five times the diameter. By providing a long valve lever arm 106, this allows the valve head 104 to lie flat against the vacuum aperture, in particular in a plane parallel to the plane of the sheet 100. If the valve lever arm 106 is too short, the valve lever arm 106 can bend to allow the valve head 104 to move towards the vacuum aperture, but the valve head 104 is positioned at a slight angle relative to the vacuum aperture. In particular, the valve head 104 is tilted slightly so that the side closest to the valve lever arm 106 is higher than the opposing side, angling the valve head 104 relative to the vacuum aperture. This results in an imperfect seal. In some embodiments, this situation can be improved by modifying the apertures to conform to the shape of the valve head 104. However, providing a longer valve lever arm 106 such as in the first embodiment can improve the seal quality without the need for costly modification to the apertures, also meaning that the sheet 100 can be readily used for various different printer tables.

The thickness of the sheet 100 and the resilience of the material can be selected to ensure desirable properties of the sheet 100. In the first embodiment, the sheet 100 has a thickness of 0.35 mm and is made from BoPET. In other embodiments, other materials and other thicknesses can be used to provide the desired resilience and deformability of the valve lever arm 106, for example depending on the magnitude of the negative pressure applied to the vacuum apertures.

FIG. 1 shows nine valves 102 for illustrative purposes only, and in practice a sheet 100 may have many more valves 102 than shown. Moreover, the size of the valves 102 has been enlarged for the purpose of explanation, and in practice may be much smaller relative to the size of the sheet 100.

Figure 2A:
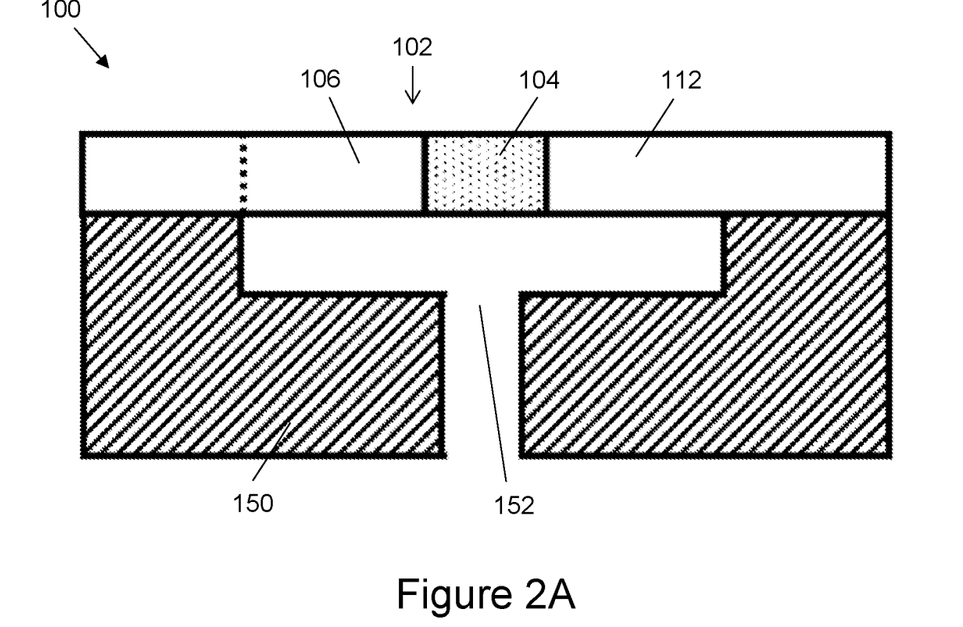
FIG. 2A shows a cross-sectional view from the side of the sheet of FIG. 1 applied to a vacuum aperture, with the valve open.
Figure 2B:
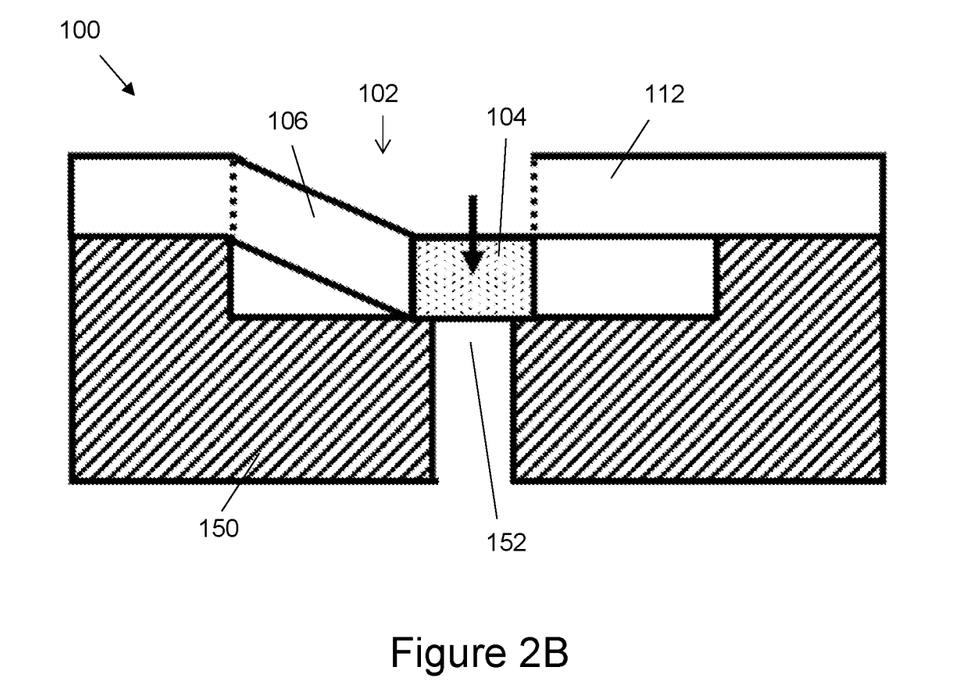
FIG. 2B shows a cross-sectional view from the side of FIG. 2A, with the valve closed.

Referring to FIGS. 2A and 2B, the sheet 100 according to the first embodiment is shown applied to a substrate support unit 150 of a printer table. The substrate support unit 150 has a vacuum aperture 152. In particular, the aperture 152 is connected to a source of negative pressure such as a vacuum pump (not shown). The sheet 100 is the same as the sheet 100 of the first embodiment. The sheet 100 of FIG. 1 has been simplified in FIGS. 2A and 2B to show only a portion of the sheet 100 with a single valve 102 to illustrate the operation with respect to a single vacuum aperture 152. In practice, the sheet 100 comprises many valves 102 and the substrate support unit comprises many vacuum apertures 152, for example at least 2000 per m$^2$.

The sheet 100 is arranged over the upper surface of the support unit 150. The sheet 100 lies in a plane parallel to the upper surface. The sheet 100 is positioned so that the valve 102 corresponds to the vacuum aperture 152. The vacuum aperture 152 defines a hole, the upper surface of which lies in a plane parallel to the upper surface of the support unit 150, and thus parallel to the plane of the sheet 100.

As described above, the valve 102 of the sheet 100 comprises a valve head 104 and a valve lever arm 106. FIG. 2A shows the arrangement of the valve 102 when the valve 102 is open. In this case, the valve 102 is in the rest position, with the valve head 104 located in the plane of the sheet 100. The valve head 104 is aligned with the sheet body 112 in the plane of the sheet 100. For example, this is the case when the vacuum aperture is not in operation, and when no negative pressure is applied. The valve head 104 is aligned with the vacuum aperture 152 so that the valve head 104 lies above the vacuum aperture 152 in a direction perpendicular to the plane of the sheet 100. However, in the open position in FIG. 2A, the valve head 104 is disposed away from the vacuum aperture 152 so that the vacuum aperture 152 is open. In this way, the upper surface of the sheet 100 is in fluid communication with the vacuum aperture 152 because the valve 102 comprises cut-outs which permits airflow through the sheet 100. Thus, when the valve head 104 is disposed away from the vacuum aperture 152, air can flow from the environment above the sheet 100, through the sheet 100, and to the vacuum aperture 152.

FIG. 2B shows the sheet 100 when a negative pressure is subsequently applied to the vacuum aperture 152 and no substrate is applied over the sheet 100. This means that the top upper surface of the valve 102 is at atmospheric pressure due to the surrounding environment. When the negative pressure is applied, for example by turning on a vacuum pump connected to the vacuum aperture 152, the negative pressure causes the pressure at the vacuum aperture 152 to increase in magnitude towards a negative pressure, while the pressure above the sheet 100 remains substantially constant due to airflow maintaining atmospheric pressure. This creates a pressure differential between the sheet 100 and the vacuum aperture 152. The pressure differential exerts a force on the valve 102. In particular, the air drag force pulls the valve head 104. As the valve head 104 is free from the sheet body 112 around the perimeter away from the valve lever arm 106, the force applied to the valve head 104 acts to pull the valve head 104 downwards towards the vacuum aperture 152. The valve head 104 therefore moves out of the plane of the sheet 100. The valve lever arm 106 connected to the valve head 104 in turn deflects downwards in response to this force. Due to the flexibility of the material, the valve lever arm 106 bends at an angle to permit movement of the valve head 104 in a downward direction towards the vacuum aperture 152. As shown in FIG. 2B, the valve lever arm 106 deflects out of the plane of the sheet 100 as the pressure differential acts on the valve 102 to form an angle with the plane of the sheet 100. The sheet body connection 110 acts as a hinge relative to the sheet body 112. As the valve head 104 is free at the opposing side from the valve lever arm 106, it is not constrained by the sheet body 112 and can move out of the plane of the sheet 100. The valve head 104 can then move towards the vacuum aperture 152 and engage against the vacuum aperture 152. Once engaged, the valve 102 is closed. The valve head 104 has an area larger than the area of the vacuum aperture 152 so that the valve head 104 can seal the vacuum aperture 152. Airflow is prevented through the vacuum aperture 152 because the valve head 104 is sealed against the vacuum aperture 152. The pressure differential retains the valve head 104 in position. Because of the resilience of the material of the sheet 100, the valve head 104 can deform to further improve the effectiveness of the seal.

By virtue of the length of the valve lever arm 106, the valve head 104 is provided with the degrees of freedom to move in a direction perpendicular to the plane of the sheet 100. In other words, the valve head 104 can move towards the vacuum aperture 152. The valve head 104 can move such that it is oriented in a plane parallel to the plane of the sheet 100. This is parallel to the plane of the vacuum aperture 152. When the valve head 104 is pulled against the vacuum aperture 152 as shown in FIG. 2B, the valve head 104 lies flat against the vacuum aperture 152 because the valve head 104 is arranged in a plane parallel to the plane of the sheet 100. This is also aided by the vacuum aperture 152 (and the base of the recess) being arranged in a plane parallel to the plane of the sheet 100. This avoids leakage around the edge due to the valve head 104 being arranged at an angle, and instead improves the effectiveness of the seal.

This arrangement can be used to seal the vacuum apertures 152 which are not covered by a substrate. Hence, the sheet 100 provides a self-sealing valve assembly. When a substrate does not cover the sheet 100, the pressure differential caused by the negative pressure of the operation of the vacuum apertures 152 means that the valve 102 automatically closes. This avoids the problem of uncovered vacuum apertures 152 reducing the effectiveness of the vacuum because instead the vacuum apertures 152 are automatically sealed.

When a substrate is applied over the valve 102, the substrate inhibits fluid communication between the environment and the vacuum aperture 152. The pressure below the sheet 100 therefore normalises and the pressure differential ceases to apply. The force no longer acts on the valve head 104. In this case, the tension in the valve lever arm 106, due to the deflection towards the vacuum aperture 152, acts to pull the valve head 104 back up to its original rest position, as shown in FIG. 2A. This brings the valve head 104 back to an equilibrium position and the valve 102 is open. In other words, the valve 102 automatically opens when the substrate is applied over the valve 102. This allows the vacuum aperture 152 to apply the vacuum force to the substrate when placed over the valve 102 so that the substrate is held down by the negative pressure. This can be used to improve alignment and thus printing quality.

Referring back to FIG. 1, each of the valves 102 can therefore be operated as described with reference to FIGS. 2A and 2B. In particular, when a substrate is placed on the sheet 100 and covers some of the valves 102 but not others, the uncovered valves 102 automatically self-seal to improve the efficiency of the vacuum hold-down on the substrate which lies over the covered valves 102. If a first valve 102 is covered by the substrate, as described above, the first valve 102 will remain open so that the negative pressure from the vacuum aperture 152 can hold down the substrate in place. If a second valve 102 is not covered by the substrate, as described above, the second valve 102 will automatically close so that the valve head 104 seals against the vacuum aperture 152. The effectiveness of the vacuum is therefore improved, and losses are minimised. This allows vacuum apertures 152 which are not covered by a substrate to be sealed automatically so that masking is not required.

This can be particularly useful for vacuum conveyors. As such, the substrate support unit with which the sheet 100 is used may be a substrate support unit for a conveyor printer. For example, a conveyor belt having belt apertures may be arranged over the sheet 100 on the substrate support unit, where the belt apertures align with the valve heads 104 and the vacuum apertures 152. As the conveyor belt passes over the sheet 100, depending on whether a substrate covers the valve 102, the valve 102 can open or close dependently as described above. This allows the uncovered vacuum apertures 152 to be sealed, even as the substrate moves with the conveyor belt and over the array of vacuum apertures 152.

Furthermore, no complex ball valves utilising small springs are required. Instead, the sheet 100 is very inexpensive and can easily be manufactured by cutting the valves 102 out of the sheet 100. Large arrays of valves 102 can be formed into the sheet 100. For example, the sheet 100 can contain at least 2000 valves 102 per $m^2$. This results in a very low cost per valve 102, especially compared to having an individual ball valve per aperture. Moreover, providing many valves per sheet makes assembly and replacement simple and fast. It is not necessary to assemble and align individual valves. This also makes it easy to rapidly prototype an array of valves because the sheet 100 can be manufactured quickly and cheaply, so that different designs can be tried and tested, specific to the system.

Figure 3:
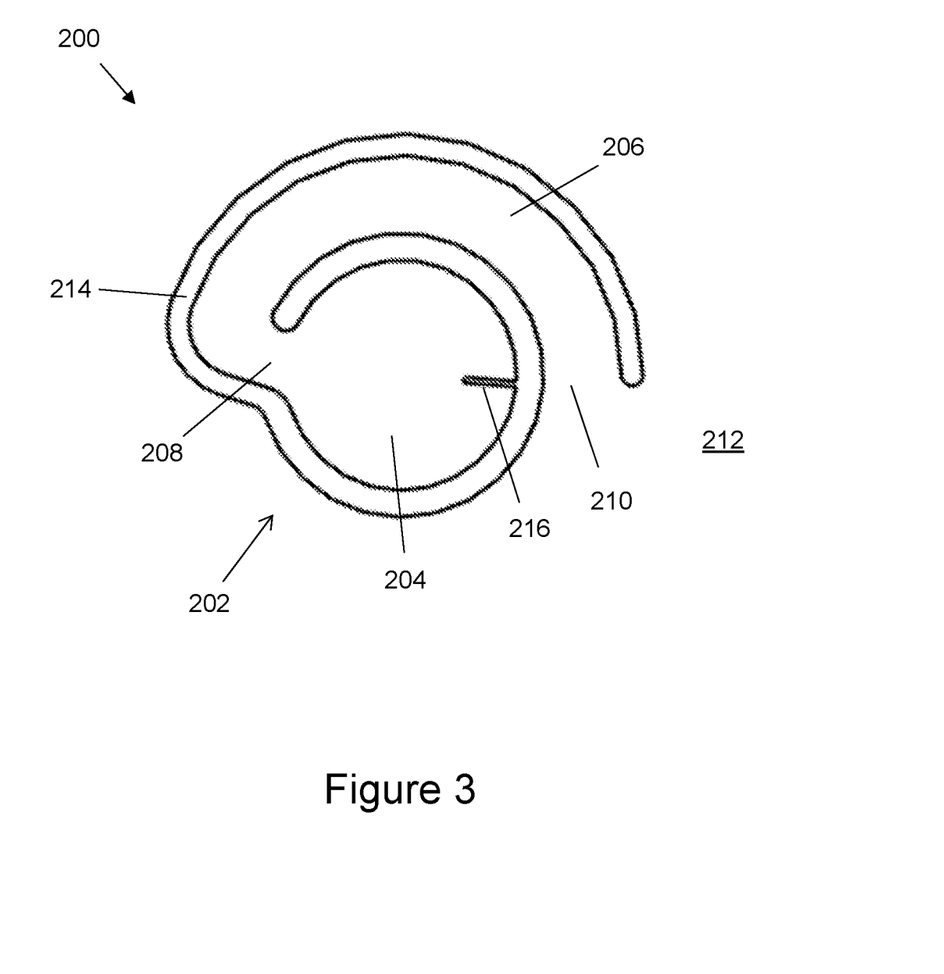
FIG. 3 shows a plan view from above of a portion of a sheet according to a second embodiment of the present disclosure.

Referring to FIG. 3, a sheet 200 according to a second embodiment is provided. The sheet 200 is identical to the sheet 100 of the first embodiment, except where provided below. In particular, the sheet 200 of the second embodiment differs from the sheet 100 of the first embodiment in that the sheet 200 comprises a different shape of the valve 202, specifically the shape of the valve lever arm 206.

The sheet 200 has a planar shape and is made from a resilient material. In the second embodiment, the resilient material is BoPET, but other resilient materials are envisaged in other examples.

FIG. 3 shows a portion of the sheet 200 showing a single valve 202 for clarity, but in practice the sheet 200 comprises a plurality of valves 202. The valves 202 each comprise a valve head 204 and a valve lever arm 206. The valve lever arm 206 is connected to the valve head 204 by a valve head connection 208. The valve lever arm 206 is connected to a sheet body 212 by a sheet body connection 210. In the same way as the first embodiment, the valve 202 is integral and cut into the sheet 200. The resilience of the valve lever arm 206 allows the valve head 204 to move towards and away from the vacuum aperture in a similar manner to close and open the valve 202.

FIG. 3 shows a cut-out 214 which is a portion cut out from the sheet 100. The cut-out 214 defines the valve 202 because it separates the sheet 100 into a sheet body 112 and the valve lever arm 206 connected to the valve head 204. The cut-out 214 is different to the cut-out of the first embodiment, which provides a different shape of the valve lever arm 206. The cut-out 214 is a single continuous cut, which simplifies the manufacturing process.

The second embodiment differs from the first embodiment in that the valve lever arm 206 has a different shape. The sheet body connection 210 is arranged at a first side of the valve head 204. The valve head connection 208 is arranged at a second side of the valve head 204, wherein the second side is opposite the first side. In this way, the valve lever arm 206 is connected to the sheet body 212 at the first side of the valve head 204 and the valve lever arm 206 is connected to the valve head 204 at the second side. In the second embodiment, the second side is substantially opposite the first side. The valve lever arm 206 is attached to the valve head 204 at a location which forms an angle relative to the location at which the valve lever arm 206 is attached to the sheet body 112, wherein the angle is defined around the perimeter of the valve head 204. In the second embodiment, the angle is around 180° so that the valve lever arm 204 extends around approximately one half of the perimeter of the valve head 204. In other examples, the angle may be between 90° and 270°. In other words, the valve lever arm 204 extends between one quarter and three quarters around the perimeter of the valve head 204.

To provide this, the valve lever arm 206 extends around the side of the valve head 204 between the sheet body connection 210 at the first side to the valve head connection 208 at the second side. In the second embodiment, the valve lever arm 206 has a curved shape which bends around the side of the valve head 204. In particular, the valve lever arm 206 extends in an arc which is generally semi-circular and concentric with the circular valve head 204. In other examples, the valve lever arm 206 may not be curved, and instead may have straight sections, for example in a U-shape, which permits the valve lever arm 206 to extend around the valve head 204.

The valve head 204 is not attached to the valve lever arm 206 at the first side of the valve head 204. In other words, the valve head 204 is free at the first side of the valve head 204. This means the valve head 204 can move freely relative to the valve lever arm 206 at the first side of the valve head 204. In this way, the only connection of the valve lever arm 206 to the valve head 204 occurs at the second side. The valve head 204 is only connected to the sheet body 112 through the attachment via the valve lever arm 206.

By providing the valve lever arm 206 extending around the valve head 204, the desired length of the valve lever arm 206 is provided for the purpose of enabling the valve head 204 to move and seal against the vacuum aperture and be arranged in a plane parallel to the plane of the sheet 200, while reducing the size of each valve 202. In particular, by arranging the valve lever arm 206 to be curved around the valve head 204, the total size of the valve 202 is reduced compared to the first embodiment. This is because the length of the valve lever arm 206 is not arranged to extend in a straight line from the valve head 204. Instead, the curved valve lever arm 206 provides the desired length of the valve lever arm 206 while providing a more compact valve 202. This saves space in the sheet 200. This is important because it allows more valves 202 to be packed into a small space in the sheet 200. This permits the density of valves 202 to be increased in the sheet 200. The curved valve lever arm 206 provides a smaller area so that the packing density can be increased.

The valve 202 also comprises a bypass 216. The bypass 216 is arranged in the valve head 204. The bypass 216 is in the form of a slit. In other examples, the bypass 216 may have other shapes. The bypass 216 is arranged at an edge of the valve head 204. In particular, the bypass 216 extends from the perimeter of the valve head 204 in an inward direction towards the centre of the valve head 204. The bypass 216 is formed into the valve head 204. More precisely, the bypass 216 is cut into the valve head 204. This can be performed in the same action as the cutting of the valve 202 into the sheet 200. In the second embodiment, the bypass 216 is continuous with the cut-out 214. This means the bypass 216 can be formed at the same time as the cut-out 214.

The bypass 216 forms an opening in the valve head 204. The bypass 216 extends to a position in the valve head 204 which aligns with the vacuum aperture 152. In this way, when the valve head 204 engages against the vacuum aperture 152, the bypass 216 provides fluid communication between the vacuum aperture 152 and the environment above the sheet 200. The bypass 216 allows rapid normalisation of the vacuum pressure which allows the valve 202 to release and provide suction to the substrate above. For example, in the case where the valve 202 is closed when the negative pressure is applied, when a substrate is subsequently placed over the valve 202, as described above the valve 202 will open due to the equalisation of the pressure differential. The bypass 216 is provided to equalise pressure more rapidly to promote the closing of the valve 202. This also enables the system to run more quietly. By tuning the bypass 216, the desired properties can be provided. The bypass 216 also only loses a small amount of air, so has little effect on the vacuum. In the second embodiment, the bypass 216 is formed as a thinner cut-out than the cut-out 214 forming the valve 202. This means that the bypass 216 provides a smaller surface area for permitting airflow through the closed valve 202, reducing losses. In other examples, the bypass 216 may be formed from a different thickness, such as the thickness of the cut-out 214 to reduce complexity of manufacture at the cost of vacuum effectiveness. In other cases, the bypass 216 may be made separately from the cut-out 214. In some examples, a bypass 216 is not required at all. In some of these cases, if the seal is not quite aligned, this may provide a similar functionality.

The valve bypass 216 may be provided in other embodiments in isolation of other features of the second embodiment. For example, the bypass 216 may be provided in combination with the valve 102 of the first embodiment without the curved valve lever arm 206 of the second embodiment. This improves the pressure equalisation in the first embodiment.

In other embodiments, the valve 102, 202 may comprise more than one valve lever arm 106, 206. For example, in one arrangement, the valve 102, 202 comprises two valve lever arms 106, 206. The two valve lever arms 106, 206 can be arranged at opposite sides of the valve head 104, 204. The two valve lever arms 106, 206 can be attached to the valve head 104, 204 at opposite sides of the valve head 104, 204. Therefore, the valve head 104, 204 is connected to the sheet body 112 via each of the valve lever arms 106, 206, providing two locations of attachment. By providing these points of attachment opposite each other, this can help move the valve head 104, 204 symmetrically, because the valve lever arm 106, 206 at either side help support the valve head 104, 204 and retain it in a plane parallel to the plane of the sheet 100, 200 when moving out of the plane of the sheet 100. This helps the valve head 104, 204 lie flat against the valve aperture 152. In examples with multiple valve lever arms 106, 206, the valve lever arms 106, 206 may be elastic. In particular, the valve lever arms 106, 206 may be configured to stretch in order to accommodate the movement of the valve head 104, 204. In other examples, the valve head 104, 204 is configured to stretch as a result of the bending of the valve lever arms 106, 206 to move the valve head 104, 204. Accordingly, the sheet 100, 200 may be made from a material able to stretch to permit the desired movement, and thus may be elastic. This can be difficult to engineer, and therefore the single arm embodiments such as the first and, in particular, the second embodiment, are particularly advantageous as it provides a compact valve which is simple to produce. For example, each of the valve lever arms 106, 206 may be straight like the first embodiment, or curved like the second embodiment. In other examples, the valve 102, 202 comprises three or more valve lever arms 106, 206. For example, in one arrangement, the valve 102, 202 comprises three valve lever arms 106, 206 arranged and attached to the valve head 104, 204 at positions distributed around the valve head 104, 204. For example, the valve lever arms 106, 206 may be distributed equally around the valve head 104, 204, The angle between the points of attachment may be dependent on the number of valve lever arms 106, 206, for example the separation being equal to the perimeter of the valve head 104, 204 divided by the number of valve lever arms 106, 206 (e.g. for three valve lever arms 106, 206, each valve lever arm 106, 206 is separated around the perimeter of the valve head 104, 204 by an amount equal to one third of the perimeter of the valve head 104, 204). This enables the valve head 104, 204 to be moved while maintaining the valve head 104, 204 arranged in a plane parallel to the plane of the sheet 200 and thus keeping the valve head 104, 204 flat against the vacuum aperture 152. In examples of multiple valve lever arms 106, 206, in some arrangements, the length of each of the valve lever arms 106, 206 is equal to or greater than a width of the valve head 104, 204. In some examples, the total combined length of the valve lever arms 106, 206 is equal to or greater than a width of the valve head 104, 204.

Figure 4:
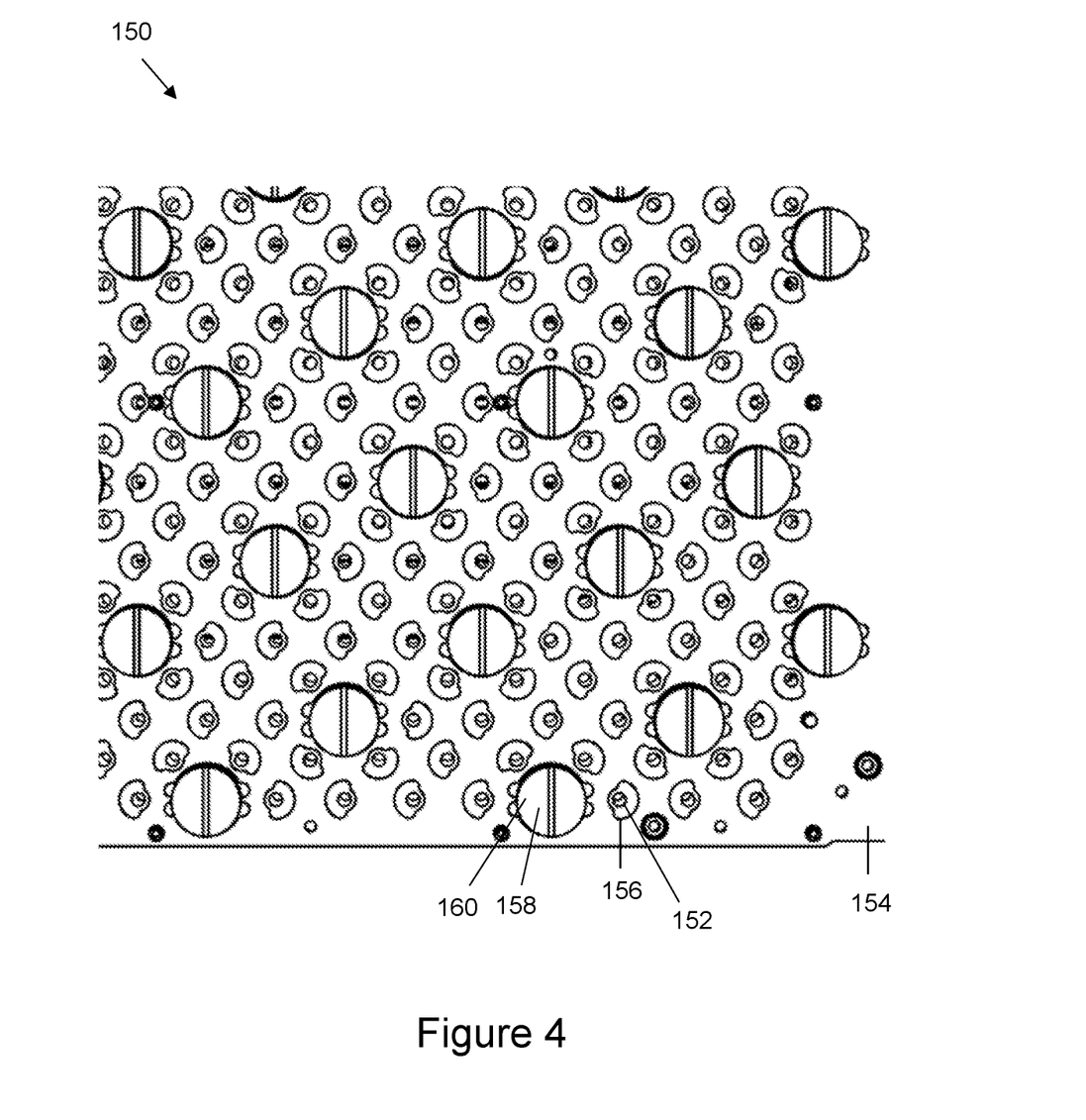
FIG. 4 shows a plan view from above of a portion of a substrate support unit for the sheet according to the second embodiment of the present disclosure.

Referring to FIG. 4, a substrate support unit 150 is provided for use with the sheet 200 of the second embodiment. The substrate support unit 150 comprises a plurality of vacuum apertures 152. The substrate support unit 150 has a mount 154 which has an upper surface. The plurality of vacuum apertures 152 are in fluid communication with the upper surface. The vacuum apertures 152 may have similar features to the vacuum apertures 152 described in relation to the first embodiment. The vacuum apertures 152 are arranged in an array in rows across the surface. The particular arrangement of the array is not essential, and may be varied in different embodiments.

The substrate support unit 150 also comprises a plurality of pockets 156. The pockets 156 are in the form of recesses in the upper surface of the mount 154. In particular, the pockets 156 extend into the thickness of the mount 154. In some examples, the pockets 156 are made by milling into the mount 154. The pockets 156 are aligned with the vacuum apertures 152. Each vacuum aperture 152 has a corresponding pocket 156. The pockets 156 are provided around the vacuum apertures 152 so that the vacuum aperture 152 is arranged within the pocket 156 and at the base of the pocket 156. The pocket 156 therefore provides a recessed volume between the vacuum apertures 152 and the upper surface of the mount 154. The pocket 156 is connected to a source of negative pressure through the vacuum aperture 152. Thus, the vacuum apertures 152 are arranged in a plane below and parallel to the upper surface.

The pockets 156 are configured to receive a valve 202 of the sheet 200. Each pocket 156 has a particular shape for receiving the shape of the valve 202. In particular, the pocket 156 has a first portion having a generally semi-circular shape for receiving the valve head 204. The first portion is arranged at one side of the pocket 156. The pocket 156 also has a second portion having a generally semi-circular shape which has a diameter larger than the first portion. The second portion is for receiving the valve lever arm 206. The second portion is arranged at the opposite side of the pocket 156 to the first portion. In this way, the pocket 156 provides a shape complementary to the shape of the valve 202. The pocket 156 provides a space for the valve 202 to be arranged, in particular so that the valve lever arm 206 can bend and the valve head 204 can extend into the pocket 156 to seal against the vacuum aperture 152. In other examples, the shape of the pocket 156 can be different to accommodate the shape of different valves 202.

FIG. 4 shows an array of pockets 156 with some pockets 156 arranged at different orientations. This is provided to further increase the packing density. The particular arrangement can depend on the shape of the valves 202. FIG. 4 also provides a plurality of air bearings 158. The air bearings 158 are porous media air bearings 158 comprising a porous media 160. In this embodiment, the porous media 160 is carbon, in particular comprising graphite, but other materials are envisaged. The air bearings 158 are arranged so that an upper surface of the air bearing 158 protrudes above the upper surface of the mount 154. The air bearings 158 are connected to a source of positive pressure (such as an air pump) so that air passes through the porous media 160 to provide an air cushion on the upper surface of the air bearing 158. This provides a thin film of air for supporting a conveyor belt. For example, the film of air is between 3 μm and 10 μm thick. This allows a conveyor belt to be placed over the upper surface of the mount 154 and it can be supported on the air bearings 158 rather than resting on the upper surface of the mount 154. This reduces friction and allows the conveyor belt to move more easily over the surface. The particular arrangement of air bearings 158 and vacuum apertures 152 provides an optimum embodiment for supporting a conveyor belt while allowing a substrate on the conveyor belt to be held down.

In other embodiments, the air bearings 158 need not be provided. In particular, the arrangement of pockets 156 on a support unit 150 may be provided without air bearings 158. For example, in cases where the substrate support unit 150 is for a flat-bed printer without a conveyor belt, it may not be necessary to provide air bearings 158 to support a conveyor belt. Although, in some cases, air bearings 158 may be provided to supply a positive pressure for releasing a substrate after printing. In the arrangement of FIG. 4, the array of vacuum apertures 152 is positioned around the air bearings 158 to accommodate the air bearings 158. The orientation of the pockets 156 is also selected to improve compactness by arranging the pockets 156 around the air bearings 158. In other examples, the arrangement may be changed, and for example the orientation may be uniform with each pocket 156 oriented in the same direction, especially in cases where no air bearings 158 are provided.

Figure 5:
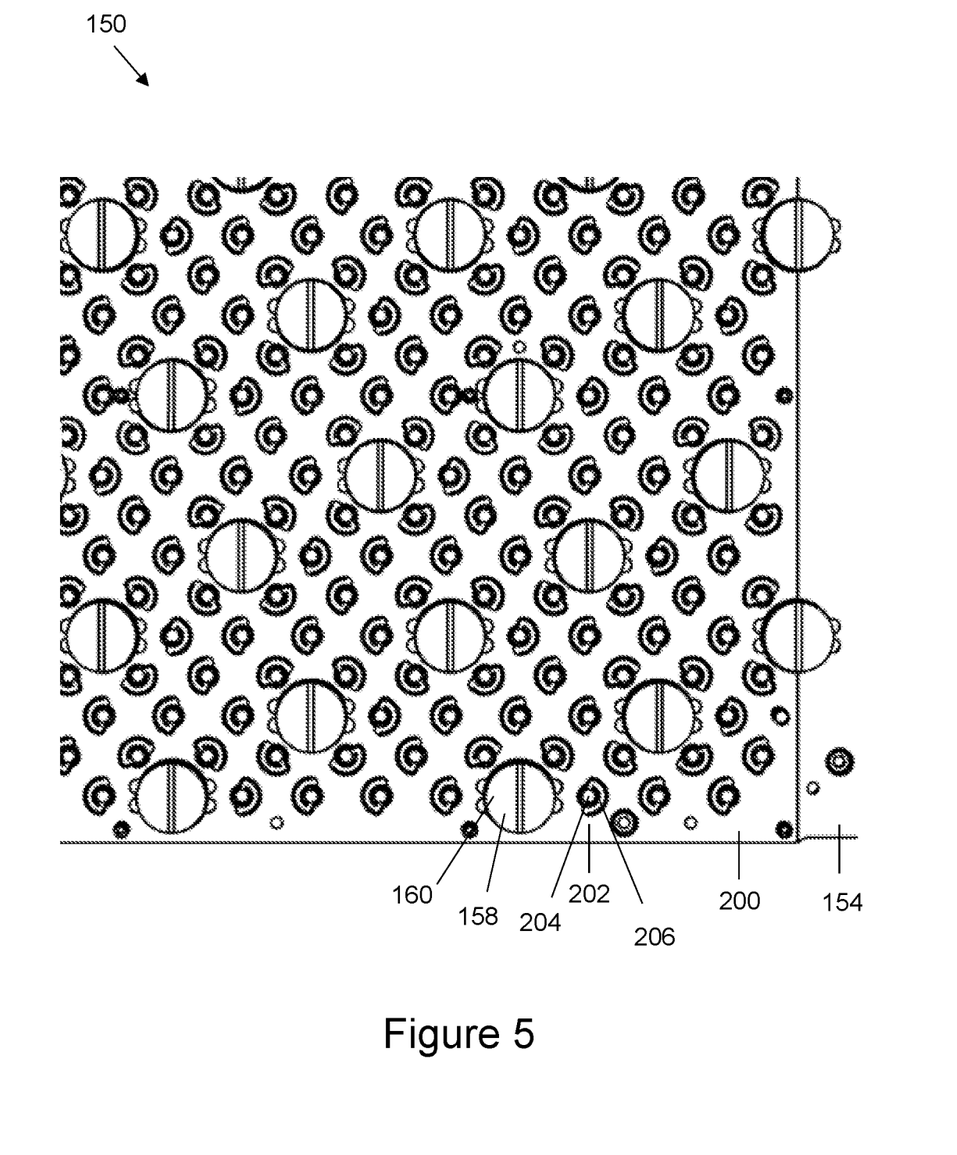
FIG. 5 shows a plan view from above of a portion of the substrate support unit of FIG. 4, with the sheet applied.

Referring to FIG. 5, the sheet 200 is shown applied to the substrate support unit 150. The sheet 200 is applied to the upper surface of the mount 154. As shown in FIG. 5, the valves 202 of the sheet 200 are arranged to align with the pockets 156 shown in FIG. 4. When the negative pressure is applied to the vacuum apertures 152 when no substrate is present on the sheet 100, the valve head 204 is pulled downwards into the pocket 156 and into contact with the vacuum aperture 152 to close the valve 202. The valve head 204 and the valve lever arm 206 are located in the pocket 156 so that they have space to move out of the plane of the sheet 100. In this embodiment, the sheet 200 has holes for receiving the air bearings 158, so that the air bearings 158 can act through the sheet 200. In other embodiments, the sheet 200 does not require holes for air bearings 158 and the substrate support unit 150 can be provided without air bearings 158.

Figure 6:
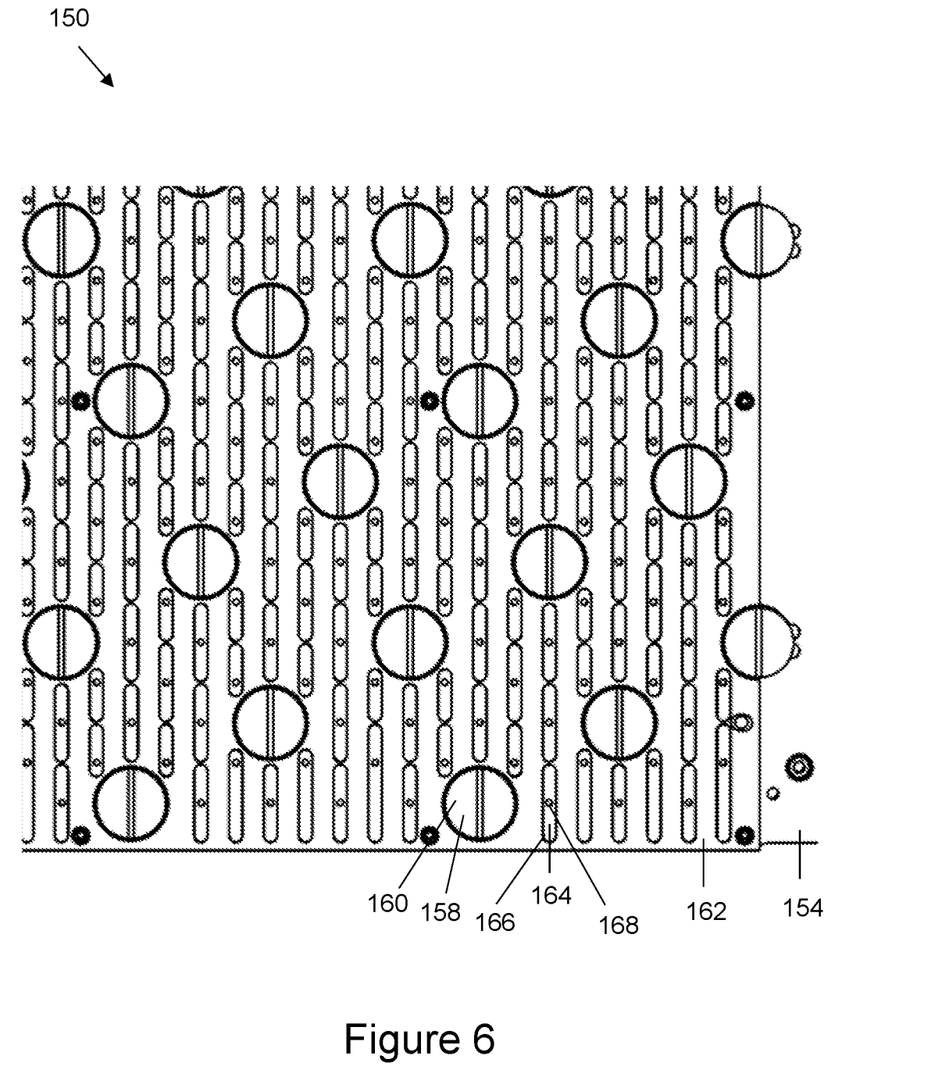
FIG. 6 shows a plan view from above of a portion of the substrate support unit of FIG. 5, with a plate applied.

Referring to FIG. 6, the substrate support unit 150 is shown with a plate 162 applied over the sheet 200. The plate 162 is a planar plate made from metal such as aluminium, but in other examples may be made from another material. The plate 162 is arranged over the sheet 200 and thus over the upper surface of the mount 154. The plate 162 defines an upper surface of the substrate support unit 150. In this embodiment, the substrate support unit 150 is for a conveyor printer, and the upper surface is the surface above which the conveyor belt moves, where the conveyor belt supports a substrate for printing. In other examples where the substrate support unit 150 is for a flat-bed printer, the upper surface is the surface configured for supporting a substrate for printing.

The plate 162 defines a plurality of apertures 164. In particular, the plate 162 has a plurality of slots 166 which extend through the thickness of the plate 162. The slots 166 extend in a direction parallel to a direction of movement of the conveyor belt. The slots 166 are arranged in rows which each extend in the direction of movement of the conveyor belt. The slots 166 comprise openings 168 in the base of the slots 166. The openings 168 correspond to the location of the valves 202. The openings 168 are aligned with the vacuum apertures 152. As such, when the valves 202 are open, the openings 168 are in fluid communication with the vacuum apertures 152.

The plate 162 comprises holes for receiving the air bearings 158 formed of porous material 160. This allows the air bearings 158 to pass through the plate 162. The upper surface of the air bearings 158 is thus arranged to protrude slightly above the upper surface of the plate 162. In the second embodiment, the upper surface of the air bearing 158 is arranged 150 μm above the upper surface of the plate 162. As the air bearings 158 protrude from the upper surface of the plate 162, the conveyor belt does not sag between air bearings 158 and therefore avoids contact with the upper surface of the plate 162. When a conveyor belt is placed over the plate 162, the conveyor belt is supported over the upper surface by the air bearings 158. When a positive pressure is applied through the air bearings 158, the conveyor belt is supported on the air bearings 158 so that it is held at a position slightly above the upper surface so that it avoids resting on the upper surface of the plate 162. This reduces friction during movement of the conveyor belt. In other embodiments, the air bearings 158 are not required, and the conveyor belt can run over the upper surface of the plate 162. In yet other embodiments of a flat-bed printer, the substrate can be arranged on the upper surface either on top of the air bearings 158, or on the upper surface of the plate 162 in cases where air bearings 158 are not provided.

The conveyor belt comprises belt apertures, and these belt apertures can be arranged in rows which correspond to the rows of slots 166. This allows the negative pressure from the vacuum apertures 152 to be transferred through the belt apertures to a substrate placed on the conveyor belt.

A substrate placed over the conveyor belt can then be held down by the vacuum pressure. As mentioned above, when a substrate passes over a vacuum aperture 152, the valve 202 opens to allow the negative pressure to act on the substrate through the slots 166 and through the belt apertures. The valve 202 takes time to open, and this time can be minimised by forming the moving part of the valve 202 (the valve head 204 and the valve lever arm 206) as light as possible. This can be controlled by the thickness of the sheet 200 and the selection of material of the sheet 200. In the second embodiment, the sheet 200 is made from BoPET and is 0.35 mm thick, which keeps the opening time short as desired. After the substrate passes further along the conveyor belt and no longer covers the vacuum aperture 152, the valve 202 automatically closes due to the pressure differential. This improves the vacuum force across the array as a whole without requiring masking. This makes it particularly useful for a conveyor belt system as the substrate continually moves over different vacuum apertures 152, and thus it is not possible to mask uncovered vacuum apertures 152.

In other examples, the sheet 100 of the first embodiment may be used in the substrate support unit 150 in place of the sheet 200. Features of the first embodiment may be readily applied to the sheet 200 used in the substrate support unit 150 and vice versa. For example, it will be appreciated that the sheet 200 used with the substrate support unit 150 may comprise valves 202 having straight valve lever arms 206, or at least two valve lever arms 206 as described above.

In other examples, the sheet 200 may be used in a substrate support unit 150 for a printer other than a conveyor printer, such as a flat-bed printer. In this case, the sheet 200 provides the same advantages of automatically closing the valves 202 to improve the vacuum quality while providing a high density of vacuum apertures 152.

In an alternative embodiment, instead of providing the pockets 156 milled out of the mount 154, the pockets 156 can be provided in a separate sheet. In particular, a second sheet may be provided. The second sheet comprises a plurality of recesses formed into the second sheet. The recesses can be cut into the second sheet, such as by laser cutting in a similar manner to the sheet 100, 200. The recesses extend through at least a part of the thickness of the second sheet. In some examples, the recesses may extend through the entire thickness and be formed as holes. The recesses act in the same way as the pockets 156 and replace the pockets 156 in the mount 154. The second sheet is arranged over the upper surface of the mount 154 in use, with the pockets 156 aligned with vacuum apertures 152. Thus, the recesses provide fluid communication between the vacuum apertures 152 and the upper surface of the second sheet. The second sheet can then be used in combination with the sheet 100, 200 (the first sheet). The first sheet 100, 200 is placed over the second sheet so that a stack of sheets is formed. Each recess of the second sheet is configured to receive a valve of the first sheet 100, 200 when the first sheet 100, 200 is arranged over the second sheet. Thus, when the first sheet 100, 200 is placed over the second sheet, the valves 102, 202 correspond to the recesses in the second sheet.

The recesses operate analogously to the pockets 156 described above. The recesses, by virtue of the thickness of the second sheet, provide a space to permit movement of the valve head 104, 204 out of the plane of the first sheet 100, 200 towards the vacuum aperture 152 for the purpose of closing the valve 102, 202. The thickness of the second sheet can be selected to provide the desired space, or multiple second sheets can be used. For example, different sheets may have different shapes to accommodate different portions of the valve 102, 202 which will be arranged at different locations throughout the thickness of the stack of sheets. For instance, an uppermost sheet may provide space for the valve lever arm 106, 206 and the valve head 104, 204, and a middle sheet may provide space for a portion of the valve lever arm 106, 206 which extends beyond the thickness of the uppermost sheet, and a lower sheet may provide space only for the valve head 104, 204 to lie against the vacuum aperture 152. Other arrangements are possible in other examples.

The shape of the recesses can be selected to correspond to the shape of the valves 102, 202. For example, for the valves 202 of the second embodiment, the recesses may have a similar shape to the pockets 156 to complement the shape of the valves 202 of the second embodiment, whereas for the valves 102 of the first embodiment, the recesses may be shaped to receive the lollipop shape of the valves 102 of the first embodiment.

The second sheet may be easily manufactured by cutting portions from the sheet, and has similar advantages to the first sheet 100, 200. The second sheet may be manufactured at the same time as the first sheet 100, 200, and similar manufacturing processes can be used. This is much simpler and cheaper than machining the mount 154 to form the pockets 156. The second sheet may be made from the same materials as the first sheet, and for example is made from BoPET. In some examples, it is not necessary for the second sheet to be made from a resilient material so save costs.

Additionally, where the shape or arrangement of the valve 102, 202 is changed, the mount 154 would have to be replaced if the pockets 156 are no longer complementary. Instead, a second sheet could simply be cut to the desired shape, using a fast and cheap manufacturing process, and eliminating down time of the system. Controlling the depth of the cut by milling the pockets 156 is also difficult to get the correct counterbore compared to simply drilling the through-hole that forms the vacuum aperture 152. In contrast, the counterbore depth can be specified easily by the thickness of the second sheet. The second sheet may also comprise holes for receiving the air bearings therethrough, if provided.

The invention claimed is:

1. A sheet for an array of vacuum apertures in a substrate support unit of a printer, comprising:
   a plurality of valves formed into the sheet;
   wherein the sheet is made from a resilient material; and
   wherein each valve comprises a valve head for sealing a vacuum aperture in the substrate support unit, and a valve lever arm for permitting movement of the valve head towards and away from the vacuum aperture in order to open and close the valve; and
   wherein the valve lever arm extends from the sheet at a first side of the valve head around the side of the valve head and is connected to the valve head at a second side opposite the first side.

2. The sheet according to claim 1, wherein the valve lever arm is curved around the side of the valve head between the first side and the second side.

3. The sheet according to claim 1, wherein the resilient material comprises a plastic.

4. The sheet according to claim 3, wherein the plastic comprises BoPET.

5. The sheet according to claim 1, wherein the sheet has a thickness of between 0.1 mm and 0.5 mm.

6. The sheet according to claim 1, wherein the valve lever arm has the same thickness as the remainder of the sheet.

7. The sheet according to claim 1, wherein the plurality of valves are defined by a plurality of cut-outs in the sheet.

8. The sheet according to claim 1, wherein the valve head is connected to the sheet by the valve lever arm.

9. The sheet according to claim 1, wherein the valve lever arm is configured to permit the valve head to move out of the plane of the sheet.

10. The sheet according to claim 9, wherein the valve lever arm is configured to cause the valve head to remain parallel to the plane of the sheet when the valve head is arranged out of the plane of the sheet.

11. The sheet according to claim 1, wherein the valve lever arm has a length equal to or greater than a width of the valve head.

12. The sheet according to claim 1, wherein the valve lever arm is configured to permit the valve head to lie flat against the vacuum aperture to seal the vacuum aperture.

13. The sheet according to claim 1, wherein each valve comprises a bypass for equalising pressure.

14. A substrate support system for a printer, comprising:
a support unit having an upper surface comprising:
   a plurality of vacuum apertures arranged in fluidic communication with a source of negative pressure; and
   a plurality of recesses aligned with the plurality of vacuum apertures;
a sheet of valves, wherein the sheet comprises:
   a plurality of valves formed into the sheet;
   wherein the sheet is made from a resilient material; and
   wherein each valve comprises a valve head for sealing a vacuum aperture in the support unit, and a valve lever arm for permitting movement of the valve head towards and away from the vacuum aperture in order to open and close the valve;
   wherein the lever arm extends from the sheet at a first side of the valve head around the side of the valve head and is connected to the valve head at a second side opposite the first side; and
   wherein the sheet is arranged on the upper surface, and wherein the valves are arranged in the respective recesses.

* * * * *